US 12,307,450 B2

United States Patent
Chen et al.

(10) Patent No.: US 12,307,450 B2
(45) Date of Patent: May 20, 2025

(54) TOKENIZED CONTACTLESS TRANSACTION ENABLED BY CLOUD BIOMETRIC IDENTIFICATION AND AUTHENTICATION

(71) Applicant: Visa International Service Association, San Francisco, CA (US)

(72) Inventors: Yuexi Chen, Foster City, CA (US); Nicholas Vondrak, San Carlos, CA (US); Erik Friend, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 768 days.

(21) Appl. No.: 17/283,897

(22) PCT Filed: Oct. 8, 2019

(86) PCT No.: PCT/US2019/055220
§ 371 (c)(1),
(2) Date: Apr. 8, 2021

(87) PCT Pub. No.: WO2020/076845
PCT Pub. Date: Apr. 16, 2020

(65) Prior Publication Data
US 2021/0344674 A1  Nov. 4, 2021

Related U.S. Application Data

(60) Provisional application No. 62/744,571, filed on Oct. 11, 2018.

(51) Int. Cl.
*G06Q 20/38* (2012.01)
*G06F 21/32* (2013.01)
(Continued)

(52) U.S. Cl.
CPC .......... *G06Q 20/388* (2013.01); *G06F 21/32* (2013.01); *G06F 21/35* (2013.01); *G06F 21/45* (2013.01);
(Continued)

(58) Field of Classification Search
None
See application file for complete search history.

(56) References Cited

U.S. PATENT DOCUMENTS

2011/0191248 A1* 8/2011 Bishop ................. G06Q 20/363
 705/67
2013/0197991 A1  8/2013 Basu et al.
(Continued)

FOREIGN PATENT DOCUMENTS

CN  107005563 A  8/2017
CN  107430731 A  12/2017
(Continued)

OTHER PUBLICATIONS

CN201980066426.8 , "Office Action", Jul. 6, 2023, 18 pages.
(Continued)

*Primary Examiner* — Scott S Trotter
*Assistant Examiner* — Amit Patel
(74) *Attorney, Agent, or Firm* — Kilpatrick Townsend & Stockton LLP

(57) ABSTRACT

Described herein are a system and techniques for conducting transactions upon receiving a biometric sample from a user. In some embodiments, a security device obtains a biometric sample from a user. The security device then provides the biometric sample, or a biometric template derived therefrom, to a service provider, which is able to identify and authenticate the user based on the biometric sample. The service provider then obtains access credential and/or supplemental information for the user and provides it to the (Continued)

security device. The security device is then capable of completing a transaction using the received access credential data. In some embodiments, this may involve generating a cryptogram to be used in the transaction.

20 Claims, 6 Drawing Sheets

(51) Int. Cl.
| | | |
|---|---|---|
| *G06F 21/35* | (2013.01) | |
| *G06F 21/45* | (2013.01) | |
| *G06Q 20/40* | (2012.01) | |
| *G06V 40/16* | (2022.01) | |
| *G07C 9/10* | (2020.01) | |
| *G07C 9/37* | (2020.01) | |
| *G07C 9/38* | (2020.01) | |
| *H04L 9/08* | (2006.01) | |
| *H04L 9/32* | (2006.01) | |
| *H04L 9/40* | (2022.01) | |

(52) U.S. Cl.
CPC ... *G06Q 20/3829* (2013.01); *G06Q 20/40145* (2013.01); *G06Q 20/405* (2013.01); *G07C 9/10* (2020.01); *G07C 9/37* (2020.01); *G07C 9/38* (2020.01); *H04L 9/088* (2013.01); *H04L 9/3231* (2013.01); *H04L 63/0861* (2013.01); *H04L 63/0884* (2013.01); *H04L 63/105* (2013.01); *G06V 40/172* (2022.01)

(56) References Cited

U.S. PATENT DOCUMENTS

| | | | |
|---|---|---|---|
| 2014/0337225 | A1 | 11/2014 | Van Heerden et al. |
| 2014/0337335 | A1 | 11/2014 | Gordon et al. |
| 2015/0095235 | A1 | 4/2015 | Dua |
| 2015/0254645 | A1 | 9/2015 | Bondesen et al. |
| 2016/0140545 | A1* | 5/2016 | Flurscheim ......... H04L 63/0838 705/76 |
| 2017/0068953 | A1 | 3/2017 | Kim et al. |
| 2018/0082284 | A1 | 3/2018 | Gomes et al. |

FOREIGN PATENT DOCUMENTS

| | | |
|---|---|---|
| CN | 108292412 A | 7/2018 |
| KR | 20170030408 A | 3/2017 |

OTHER PUBLICATIONS

PCT/US2019/055220 , "International Search Report and Written Opinion", Jan. 31, 2020, 20 pages.
SG11202103512U, "Written Opinion", Jan. 16, 2023, 7 pages.
CN201980066426.8 , "Notice of Decision to Grant", May 23, 2024, 6 pages.
CN201980066426.8 , "Office Action", Mar. 16, 2024, 9 pages.
SG11202103512U , "Further Written Opinion", Mar. 15, 2024, 7 pages.

* cited by examiner

TOKENIZED CONTACTLESS TRANSACTION ENABLED BY CLOUD BIOMETRIC IDENTIFICATION AND AUTHENTICATION

CROSS-REFERENCE TO RELATED APPLICATIONS

This application is a National Stage of International Application No. PCT/US2019/055220, filed Oct. 8, 2019, which claims priority to U.S. Patent Application No. 62/744,571, filed on Oct. 11, 2018, the disclosures of which are herein incorporated by reference in their entirety for all purposes.

BACKGROUND

Today, in-person transactions require users to carry a payment instrument like a chip card, an NFC mobile phone, or an NFC watch. Secure applications and secure storage on the payment instrument provide protection against fraud. Thus, a low exchange rate is able to be achieved by assigning liability to an authorization provider (e.g., an issuer).

Server-based or cloud-based biometric identification and authentication services, like CLEAR™, often don't require users to carry any identification device. Strong user identification and authentication provides protection against payment fraud as well. However, without a payment device and dynamic chip authentication data, the subsequent transaction is not compatible with an existing EMV (Europay, Master-Card, Visa) POS infrastructure. Existing biometric authentication payment solutions require a user to carry an EMV chip card.

For some transactions, users need to provide additional information. For example, a user may be asked to present an ID card to verify their age for an alcohol purchase, or provide a loyalty card to receive a discount. Thus, the user would need to present other cards in addition to a payment card to complete the transaction. This is particularly cumbersome as it requires many steps.

Embodiments of the invention address these and other problems individually and collectively.

SUMMARY

Embodiments of the disclosure are directed to a system and techniques for conducting transactions upon receiving a biometric sample from a user. In some embodiments, a security device obtains a biometric sample from a user. The security device then provides the biometric sample or a biometric template derived thereof to a service provider, which is able to identify and authenticate the user based on the biometric sample. The service provider then obtains access credential and/or supplemental information for the user and provides it to the security device. The security device is then capable of completing a transaction using the received access credential data. In some embodiments, this may involve generating a cryptogram to be used in the transaction.

One embodiment is directed to a method by a security device comprising receiving a biometric sample from a user, transmitting the biometric sample of the user or a biometric template derived thereof to a service provider computer, wherein the service provider computer matches the biometric sample to a user account, upon matching the biometric sample to the user account, receiving access credential data and supplemental information associated with the user account, generating an interaction cryptogram, and transmitting the access credential data and the interaction cryptogram to an access device in communication with the security device, such that the access device is caused to generate an authorization request message and transmit the authorization request message to an authorization provider for authorization.

Another embodiment is directed to a security device comprising: a processor; and a memory including instructions that, when executed with the processor, cause the security device to, at least: receive a biometric sample from a user, transmit the biometric sample of the user or a biometric template derived thereof to a service provider computer, wherein the service provider computer matches the biometric sample to a user account, upon matching the biometric sample to the user account, receive access credential data and supplemental information associated with the user account, generate an interaction cryptogram, and transmit the access credential data and the interaction cryptogram to an access device in communication with the security device, such that the access device is caused to generate an authorization request message and transmit the authorization request message to an authorization provider for authorization.

Further details regarding embodiments of the invention can be found in the Detailed Description and the Figures.

DETAILED DESCRIPTION

Figure 1:
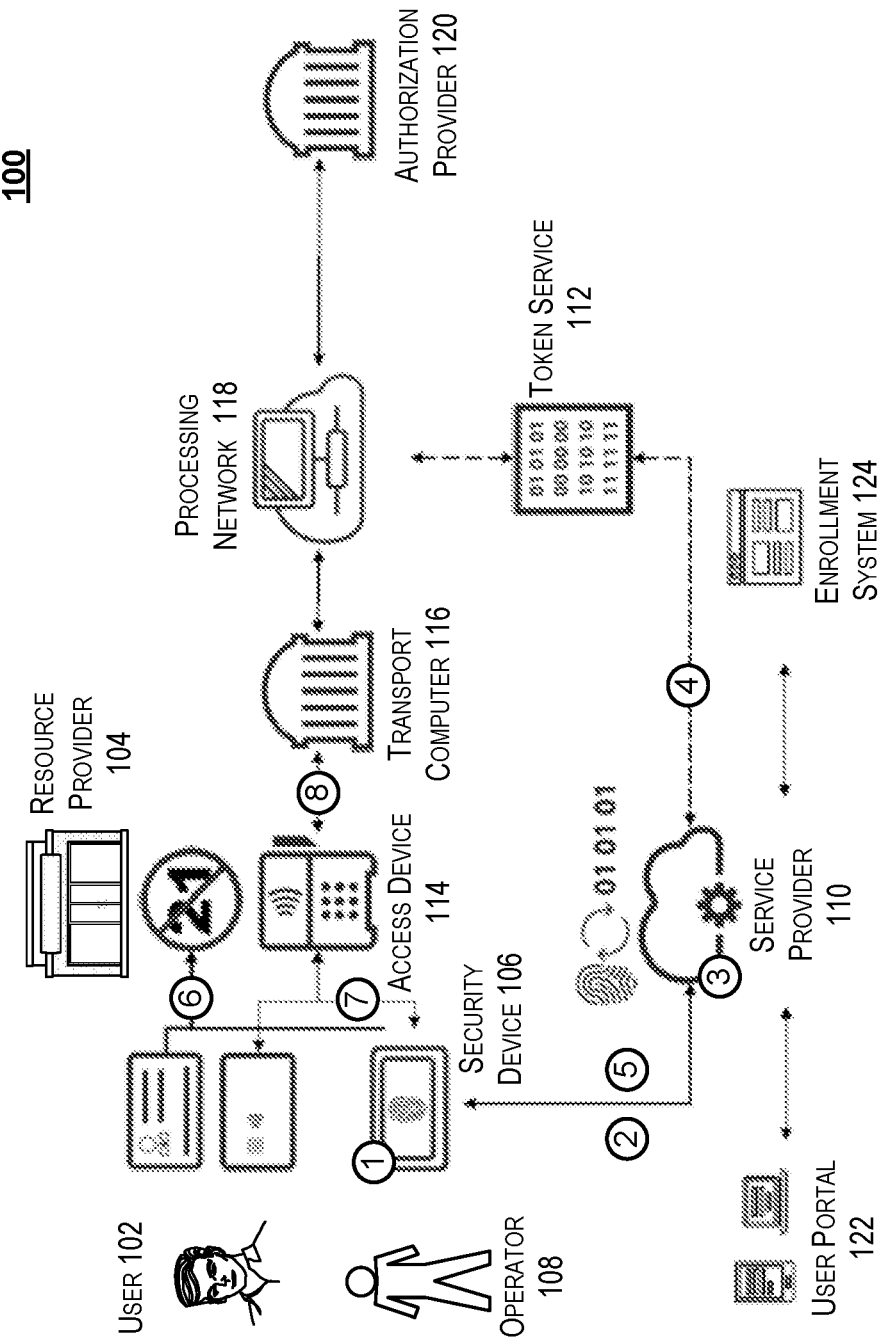
FIG. 1 depicts an example process for performing biometric identification and authentication in accordance with embodiments of the disclosure.

Embodiments of the disclosure are directed to a system and techniques for conducting transactions using a biometric sample from a user. To do this, a security device obtains a biometric sample from a user such as facial data or fingerprint data. The security device then provides the biometric sample to a service provider. The service provider then matches the biometric sample to biometric templates stored in relation to a user account to identify a match. The service provider then obtains access credential data for the user. In some embodiments, this may involve obtaining a token from a token service. The service provider may retrieve supplemental information for the user and provides it to the security device. The security device is then capable of completing a transaction using the received access credential data. In some embodiments, this may involve generating a cryptogram to be used in the transaction, which may be provided to an access device.

Prior to discussing embodiments of the invention, a description of some terms may be helpful in understanding embodiments of the invention.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider. Additionally, "access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

"Authentication data" may include any data suitable for authenticating something or someone. For example, authentication data may include data suitable for authenticating a user or mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

An "authorization provider" may be an entity that authorizes a request, typically using an authorizing computer to do so. An authorization provider may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user. The issuer of a particular user account may determine whether or not to approve or deny specific transactions. An issuer may authenticate a user and release funds to an acquirer if transactions are approved (e.g., a user's account has sufficient available balance and meets other criteria for authorization or authentication).

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, iris, etc.

A "biometric sample" or "biometric information" may include biometric data obtained by any type of input sensor that can be used to identify a particular user. The data may be either an analog or digital representation of the user's biometric attributes, generated prior to determining distinct features needed for matching. For example, a biometric sample of a user's face may be image and/or depth data. In another example, a biometric sample of a user's voice may be audio data.

A "biometric template" may include biometric data which has been processed and stored with respect to a user. For example, a biometric sample may be processed by identifying a set of relationships between locations of facial landmarks identified within the biometric sample. In this example, the set of relationships may be stored as a biometric template. A biometric sample may be matched to a stored biometric template by identifying a set of relationships between locations of facial landmarks identified within the biometric sample and comparing that set of relationships to one stored with respect to the biometric template.

A "consumer" may be an individual who acquires a good or service. In some embodiments, a consumer may be associated with one or more personal accounts and/or mobile devices. The consumer may also be referred to as a cardholder, account holder, or user in some embodiments.

A "credential," or "access credential," may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "interaction cryptogram" may be encrypted data associated with a particular interaction. In some embodiments, a cryptogram may be used to verify a transaction. In some embodiments, a cryptogram may be generated for a particular transaction by applying a cryptographic algorithm to a number of transaction and/or user details. In some embodiments, a cryptogram received in an authorization request message may be verified prior to authorizing a transaction. To do this, the cryptogram may be independently generated and compared to the received cryptogram by the verifier.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "key" or "cryptographic key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "merchant" may typically be an entity that engages in transactions and can sell goods or services, or provide access to goods or services. A merchant may operate in a physical storefront (e.g., brick and mortar) or they may operate a digital storefront (e.g., a website). A merchant may also sell goods or services through a third party aggregator that offers goods and services from a plurality of merchants. Merchants may provide receipts to customers along with the sale of a good or service. The receipt may be a printed receipt or a digital receipt. Digital receipts may be sent to the customer via email or text message. Merchants may provide detailed digital receipts to an authorization provider of the user's account used to conduct the transaction via a processing server.

A "payment processing network" may be data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network may use any suitable wired or wireless network, including the internet.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

A "security device" may comprise any suitable computing device that can be used for identification and authentication of a user. In some embodiments, a security device may have payment capabilities, such as an ability to receive transaction details from an access device (such as a POS), select a payment account (or token) to be used in completing a transaction, generate a transaction cryptogram, and communicate with the access device to initiate the transaction using the token and generated cryptogram. In some embodiments, the security device may include one or more input sensors capable of obtaining biometric information as well as one or more communication means for communicating with other electronic devices.

A "server computer" may be a powerful computer or cluster of computers. For example, the server computer can be a large mainframe, a minicomputer cluster, or a group of servers functioning as a unit. In one example, the server computer may be a database server coupled to a Web server.

A "service provider" may be an entity that can provide a service. The service could be verification or authentication. In some embodiments, a service provider may be an entity that stores biometric sample and can provide authentication services. the service provider may store the biometric sample, for example, in the cloud or on a server. The biometric sample stored may include biometric templates. An example of a service provider may include CLEAR™.

"Supplemental information" may include any information that may supplement other information. In some embodiment, supplemental information may include any user-related information which is supplemental to payment account data for a user. Supplemental information may include any combination of demographic and/or biological details associated with the user (e.g., occupation, age, gender, etc.). In some embodiments, the supplemental information may include access level details associated with an account of the user. For example, supplemental information may include ticketing information for an event associated with the user or an indication of a membership status or level of access with a particular merchant or other resource provider.

A "transport computer" may be a computer that can transport data from one computer to another. In some embodiments, a transport computer may be an acquirer computer, which may be operated by an acquirer. Acquirers typically provide merchants with a bank account, and in some cases, transaction accepting infrastructure. Generally, after a transaction has been authorized and as part of the settlement process, funds are transferred from the issuer to merchant's account at the acquirer. The acquirer may also communicate payment transaction status with the merchant.

A "terminal" may be a device at which a user enters data into a computer system. A point of sale (POS) terminal can allow the consumer to enter their payment information. Information may be entered into a terminal by means including a keypad, a stylus on a screen, and a contactless interface.

A "token" may be a substitute value for a credential. A token may be a string of numbers, letters, or any other suitable characters. Examples of tokens include payment tokens, access tokens, personal identification tokens, etc.

A "token service" may be an entity that provides token management services. This may include issuing, validating, renewing, and canceling tokens.

A "user" may include an individual or a computational device. In some embodiments, a user may be associated with one or more personal accounts and/or mobile devices. In some embodiments, the user may be a cardholder, operator, account holder, or consumer.

Embodiments of the invention provide a method for tokenized contactless card-present transactions, enabled by biometric identification and authentication.

Before a transaction, a consumer may enroll with a service provider via an enrollment system. Enrollment may include entering biometric data via a biometric terminal to the biometric authentication system. The service provider can then store the biometric sample as a template. The enrollment can happen at any time prior to the first transaction. Consumers that have previously enrolled with the service would not need to complete this step again.

The consumer can then tokenize a payment method through the service provider. Payment methods can include credit, debit, and prepaid options. In the case of a prepaid card, instant issuance and tokenization can happen at the same time. The service provider can connect with a token service to complete the tokenization process including cardholder identification and verification with an issuer. The token and credential linked to the token may then stay on a server of the token service or of the service provider.

A user portal may also be made available where the user can manage their payment credentials. With this portal, the user may have options to add, delete, and update payment credentials. The user may also have an option to choose a default card associated with a particular merchant.

FIG. 1 depicts an example process for performing biometric identification and authentication in accordance with embodiments of the disclosure. In FIG. 1, by implementing a system as described herein, a user may be made capable of conducting a transaction with a resource provider such as a merchant without producing any physical identification or payment device. The process 100 depicted in FIG. 1 is described as a series of steps, each of which may involve interactions between various components of a system that embodies the techniques described herein.

In step 1, a user 102 wishing to complete a transaction with a resource provider 104 may provide a biometric sample (e.g., a fingerprint, facial scan, or palm scan) via a security device 106 associated with the resource provider 104. The security device 106 may be, for example, a tablet or mobile phone having a biometric sensor. In some embodiments, the biometric sensor may be a peripheral device which is connected to the security device. In some embodiments, the security device 106 may be operated by an operator 108 on behalf of the resource provider 104 or a service provider 110. In some embodiments, the security device 106 may include at least one camera which is used to capture an image of the user 102, in order to generate a biometric sample which comprises facial data for the user 102. In some embodiments, the security device may generate a biometric template from the biometric sample. For example, the security device may derive a set of relationships between various features of the biometric sample, and may store this set of relationships as a biometric template.

In step 2, the security device may send a message to a service provider 110 (which may operate one or more computers) that includes the captured biometric sample, or a biometric template derived from the biometric sample. In some embodiments, the service provider computer 110 may be located remote to the security device 106. In these embodiments, the security device 106 may communicate with the service provider 110 using any suitable communication means, including a network connection.

In step 3, the service provider 110 may operate a service provider computer that compares the captured biometric sample to a number of stored biometric samples (stored in relation to user accounts) to identify a closest match. When a closest match is found, the service provider 110 identifies the user 102 by virtue of being associated with the matched biometric sample. The service provider 110 may then identify an account associated with the user 102. In some embodiments, the service provider 110 may also retrieve supplemental information associated with the user 102 via the identified account. In some embodiments, the supplemental information may include demographic and/or biological details associated with the user (e.g., occupation, age, gender, etc.). In some embodiments, the supplemental information may include access level details associated with the account. For example, the supplemental information may include a ticket to an event associated with the user 104 or an indication of a membership status or level of access with a particular merchant or other resource provider.

In step 4, the service provider 110 may provide a request for a token credential (or token) to a token service 112. The token may be mapped by the token service 112 to the account of the user identified at step 3. In some embodiments, the service provider may also initiate retrieval of a cryptographic key (e.g., a limited use key, which may be used for only a specific number of transactions or for a specific period of time) that can be used to form a transaction cryptogram, such as an EMV (Europay MasterCard Visa) transaction dynamic cryptogram, from the token service 112. In some embodiments, if the token credential is stored with the service provider 110, a cryptogram may be generated by the service provider 110. The service provider 110 may receive the token credential in response to providing the request. In some embodiments, the service provider 110 may store the token in association with the account identified at step 3.

In step 5, the service provider 110 sends at least the identified user information and token credential to the security device 106. In some embodiments, the service provider 110 may also send a cryptogram to the security device 106. The security device 106 may also compute the cryptogram using the token credential. The identified user information may contain supplemental information associated with the user including their name, age, photo, loyalty, promotions, coupons, card art, and branding details.

In some embodiments, at least a portion of the identified user information may be presented on a display of the security device 106 for review by the user 102 and/or operator 108. Once the information has been received on the security device 106, it may be used to initiate a transaction with a resource provider 104 via an access device 114 associated with the resource provider 104.

In step 6, the security device 106 or the resource provider 104 may perform additional verifications based on the supplemental information received from the service provider 110. For example, the resource provider 104 may verify that the user is old enough to purchase an age-restricted item. In another example, the security device 106 may ensure that the user is associated with a valid ticket to an event that the user 102 is attempting to attend. The supplemental information received by the security device 106 from the service provider 110 in step 5 can be presented (e.g., displayed) to the resource provider via the security device 106. For example, the supplemental information may be the age of the user that is stored at the resource provider 110 along with the user's biometric template. In this way, the security device 106 can serve as a payment transport mechanism as well as way to present additional information needed to complete the current transaction. Note that both the supplemental information and the token or payment information can be transmitted to the security device 106 in a single data transmission. Consequently, compared to conventional systems, fewer steps are needed in embodiments of the invention to achieve a similar result.

In step 7, the resource provider 104 enters the transaction amount on the access device 114 (e.g., a point-of-sale (POS) device), then the access device 114 interacts with the security device 106 to complete the card-present transaction. In some embodiments, the security device 106 may be in communication with the access device 114 via a contactless interface. For example, the security device 114 can send the token and cryptogram to the access device 114 via near field communication (NFC) by NFC Card Emulation, NFC Host Card Emulation, quick response (QR) code or magnetic secure transmission (MST) technology. The access device 114 may transmit transaction data to the security device 106, which may, in turn, respond by providing the token credential to the access device 114. In some embodiments, the security device 106 may generate a transaction cryptogram using the user information provided by the service provider 110, the access device 114, and/or the token credential. In some embodiments, the transaction cryptogram may be formed using the transaction amount and an unpredictable number from the access device 114, along with the token. These data elements may be encrypted with a cryptographic key on the security device 106 or derived by the security device 106. In some embodiment, the cryptographic key may be the limited use key obtained from the service provider computer. The transaction cryptogram may serve as proof that the security device 106 and the access device 114 interacted during the current transaction.

In step 8, the access device 114 can use the received token and cryptogram to perform a transaction authorization and settlement processes. In some embodiments, this may involve generating, by the access device, an authorization request message comprising at least the token, the transaction cryptogram, the transaction amount, an expiration date, and the unpredictable number. The authorization request message may then be transmitted to a processing network 118 via the transport computer 116.

A processing network computer in the processing network 118 may verify the transaction cryptogram. The processing network computer may verify the transaction cryptogram by obtaining the corresponding cryptographic key that was obtained by the security device 106. The processing network computer may decrypt the transaction cryptogram using the cryptographic key to obtain the unpredictable number, the token, and the transaction amount, and may then compare this information to the information received in the authorization request message. If it matches, then the cryptogram can be validated. In other embodiments, the data elements in the authorization request message may be encrypted using the cryptographic key and the formed cryptogram can be compared to the transaction cryptogram received in the authorization request message. If the cryptogram is not verified, then the transaction may be declined or this information may be forward to the authorization provider 120. If the cryptogram is verified, then the transaction may be allowed to proceed to the authorization provider 120.

In this example, the processing network 118 may route the authorization request message to the token service 112, which may identify a payment account mapped to the token. Once identified, a second authorization request message may be generated which includes the payment account and that authorization request message may be routed to an authorization provider 120 associated with that payment account. The authorization provider 120, which may operate an authorization provider computer, may then generate an authorization response message to be provided back to the access device 114 indicating whether the transaction is approved or declined. The service provider may receive a notification from the token service that the transaction has been completed.

The user personal information and token on the resource provider devices can then be deleted. This may occur when the service provider 110 receives a token payment notification from the token service 112. The information may also be cleared when the user or the resource provider clicks a "clear" button on the security device 106 or the access device 114. Alternatively, the information may be cleared when a time out limit on the security device 106 or access device 114 is reached. If the token credentials were downloaded to the security device 110, the credentials can be invalidated by the token service 112 and a new credential can be created for the same token.

In some embodiments, a user 102 may enroll in the disclosed system prior to performance of the process described above. In at least some of these embodiments, the user 102 may access the service provider 110 via a user portal 122 instantiated on any suitable client device. For example, the service provider 110 may maintain a website, which may be accessed via a browser application executed upon the client device. In this example, the user 102 may be provided the capability to interact with the service provider 110 via the browser application. The service provider 110 may also operate an enrollment system 124 which may be accessed by the user 102 via the user portal 122. For example, the user 102 may provide user information and a biometric template to the enrollment system 124 via the user portal 122. The enrollment system 124 may then create an account for the user 102 at the service provider 110 which is associated with that biometric template.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
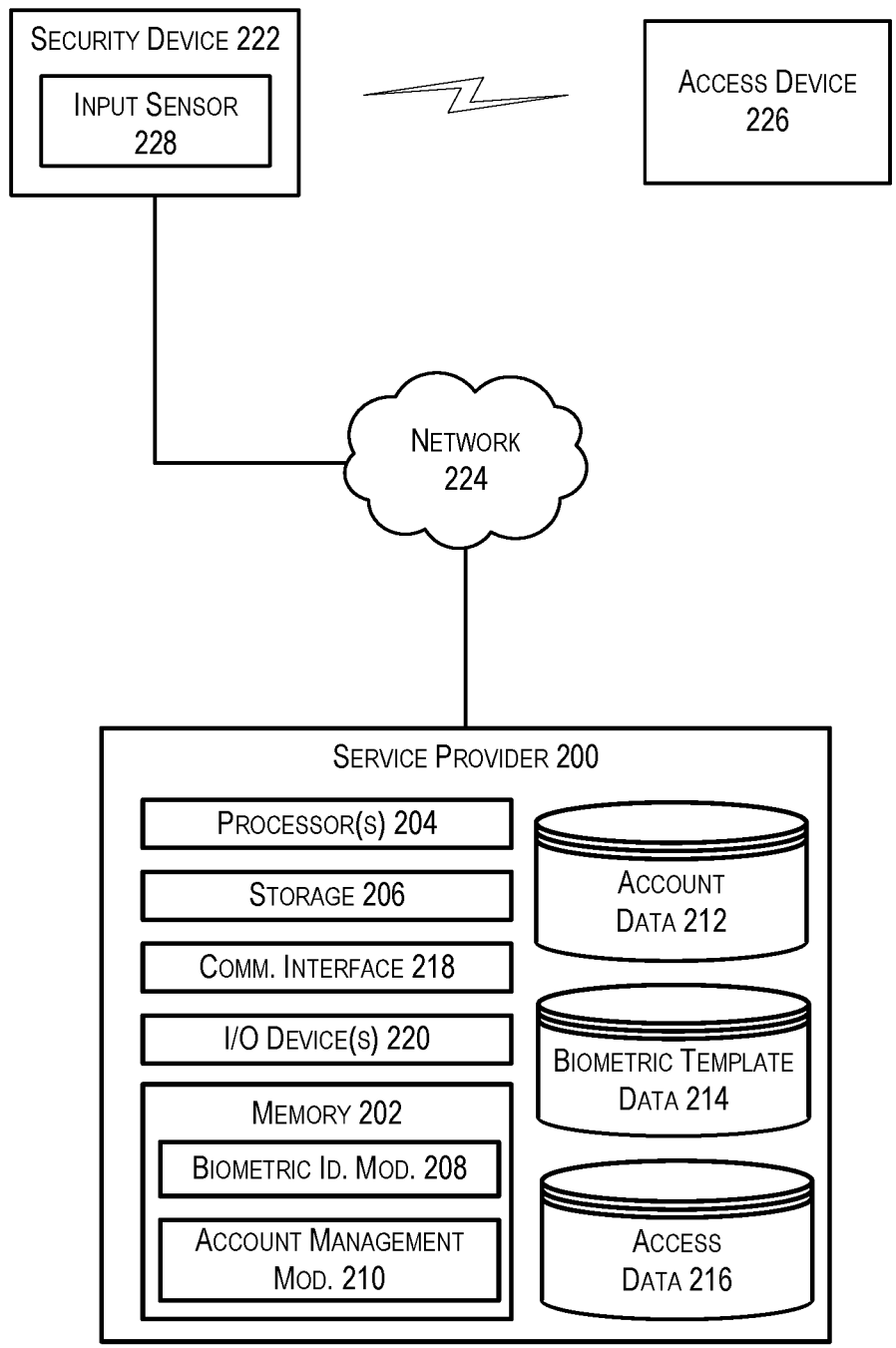
FIG. 2 depicts an illustrative example of a system or architecture in which techniques for providing access to resources in an account using biometric authentication may be implemented.

FIG. 2 depicts an illustrative example of a system or architecture in which techniques for providing access to resources in an account using biometric authentication may be implemented. In the depicted architecture, a service provider computer 200 may be in communication with a security device 222. For example, the service provider 200 may be in communication with the security device 222 via a network connection 224. In some embodiments, the security device 222 may be capable of short-range communication with an access device 226. Service provider 200 may be an example of service provider 110 depicted in FIG. 1. Similarly, security device 222 and access device 226 may be examples of security device 106 and access device 114 respectively depicted in FIG. 1.

The service provider computer 200 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, one or both of the depicted computing devices may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 200 may include at least one memory 202 and one or more processing units (or processors) 204. The processor(s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described. The memory 202 may store program instructions that are loadable and executable on the processor(s) 204, as well as data generated during the execution of these programs. Depending on the configuration and type of service provider computer 200, the memory 202 may be volatile (such as random access memory (RAM)), non-volatile (such as read-only memory (ROM), flash memory, etc.), or some combination of the two. The service provider computer 200 may also include additional storage 206, such as either removable storage or non-removable storage including, but not limited to, magnetic storage, optical disks, and/or tape storage.

Turning to the contents of the memory 202 in more detail, the memory 202 may include an operating system and one or more application programs or services for implementing the features disclosed herein including at least a biometric identification module 208 that, when used in conjunction with the processor(s) 204, is configured to match a provided biometric sample to a user account stored by the service provider, as well as to authenticate that biometric sample. In some embodiments, the memory 202 may also include account management module 210 that, when used in conjunction with the processor(s) 204, is configured to identify supplemental information to be provided to a security device 222. The memory 202 may also include a number of data stores, including account data 212, which maintains information related to a user, biometric template data 214, which maintains biometric templates stored in relation to one or more accounts stored in the account data 212, and access data 216, which maintains information on tickets, statuses, or access levels for various events and/or entities.

In some embodiments, the biometric identification module 208 may comprise code, executable by the processor(s) 204 to receive a biometric sample from a security device 222 and identify an associated account based on that biometric sample as well as authenticate that biometric sample. For example, the biometric identification module 208 may determine a closest match between a received biometric sample and biometric templates stored in biometric template data 214. In this example, once a closest match has been identified, the biometric identification module 208 may determine whether a degree to which to biometric sample matches the closest matching biometric template is greater than some threshold value. For example, upon determining that the biometric sample most closely matches biometric template A, the biometric identification module 208 may then determine that the two are 98.5% similar. In this example, authentication of the user may require a match of at least 98%. Accordingly, the biometric identification module 208 may also determine that the match is close enough to also authenticate the biometric sample. Once a biometric template is identified and the biometric sample is authenticated, the biometric identification module 208 may retrieve an account identifier indicating an account belonging to the user.

In some embodiments, the account management module 210 may comprise code, executable by the processor(s) 204 to, upon identification of an account, obtain a token and/or identify supplemental information to be provided to a security device 222. In some embodiments, once an account has been identified (e.g., by the biometric identification module 208 as described above), the account management module 210 may obtain a token from a token service provider. In some embodiments, the account management module 210 may provide the token service provider with a payment account identifier (e.g., credit card number) associated with the account. Once the account management module 210 has received the token from the token service provider, the account management module 210 may forward that token to the security device 222. In some cases, the account management module 210 may also forward information that may be used by the security device 222 to generate a cryptogram (e.g., a limited use key, counter value, etc.).

In some embodiments, the account management module 210 may identify supplemental information (e.g., an age) to be provided to a security device 222. For example, the account management module 210 may retrieve and provide an age of the user that submitted the biometric sample. In some embodiments, the account management module 210 may identify access data from the access data store 216 that indicates a level of access that should be granted to the user. For example, the account management module 210 may determine a membership status or ticketing status associated with the user. In some cases, the account management module 210 may identify ticketing information stored for the user in relation to a date and/or time. For example, upon identification of an account, the account management module 210 may identify a ticket associated with the user's account which provides access to an event being held on the current day. In this example, the account management module 210 may retrieve and provide the ticket information to the security device 222 from which the biometric sample was received.

The service provider computer 200 may also contain communications interface(s) 218 that enable the service provider computer 200 to communicate with a stored database, another computing device or server, one or more remote devices, and/or any other suitable electronic devices. In some embodiments, the communication interface 218 may enable the service provider computer 200 to communicate with other electronic devices on a network 224 (e.g., on a private network). The service provider computer 200 may also include input/output (I/O) device(s) and/or ports 220, such as for enabling connection with a keyboard, a mouse, a pen, a voice input device, a touch input device, a display, speakers, a printer, etc. In some embodiments, the service provider computer 200 may be in communication with a security device 222 and/or a access device 226 via the network 220.

In some embodiments, the network 224 may include any one or a combination of many different types of networks, such as cable networks, the Internet, wireless networks, cellular networks, and other private and/or public networks. While the illustrated example depicts various electronic devices accessing the service provider computer 200 over the network 224, the described techniques may equally apply in instances where the electronic devices interact with the service provider computer 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.). Network 224 may also include payment processing networks configured to route authorization request messages to their appropriate authorization providers.

The security device 222 may be any type of computing device such as, but not limited to, a mobile phone, a smart phone, a personal digital assistant (PDA), a laptop computer, a desktop computer, a server computer, a thin-client device, a tablet PC, etc. The security device 222 may include a memory and one or more processors capable of processing user input. The security device 222 may also include one or more input sensors 228, such as a camera, a microphone, accelerometers, a fingerprint scanner, or other suitable device for receiving user input, and more particularly a user's biometric sample. As is known in the art, there are a variety of input sensors capable of detecting user input, each of which may be included in the security device 222. The user input obtained by the input sensors 224 may be from a variety of data input types, including, but not limited to, audio data, visual data, or other suitable biometric data. In some embodiments, input sensors 224 may include a number of different types of camera devices, one or more of which may be a range camera device (e.g., a depth sensor) capable of generating a range image, and another of which may be a camera configured to capture image information. Accordingly, biometric information obtained via input sensors 224 may include image information and/or depth information (e.g., a range map of a face).

The access device 224 may be any suitable type of computing device that manages access to an area or resource. The access device 224 may be configured to receive a token from a security device 222 and, obtain approval for a transaction using the token, and complete the transaction upon determining that the transaction has been approved. In some embodiments, the access device 226 may be configured to complete the transaction by printing a receipt for the transaction or by providing instructions to an access gate to cause it to open.

Figure 3:
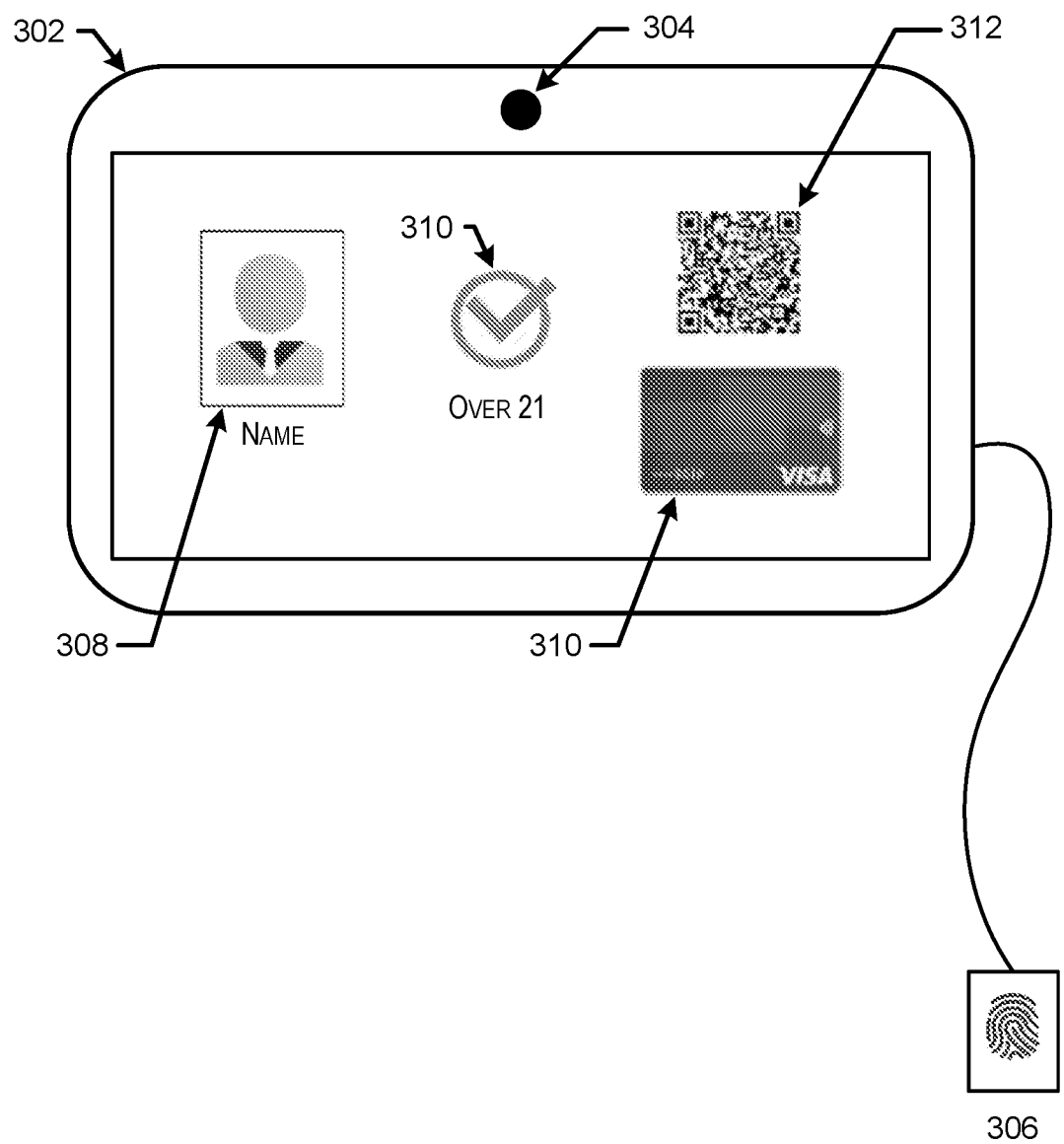
FIG. 3 depicts an illustrative example of a security device that may be implemented in accordance with at least some embodiments.

FIG. 3 depicts an illustrative example of a security device that may be implemented in accordance with at least some embodiments. Security device 302 may be an example of security device 222 as described with respect to FIG. 2 above. As depicted in FIG. 3, a security device 302 may include a display screen configured for presentation of graphical data. As described elsewhere, the security device 302 may have installed one or more input sensors 304, such as a camera device. Additionally, the security device 302 may be configured to interact with one or more external input sensors 306. For example, the security device 22 may connect to a fingerprint scanner via a port (e.g., a USB port).

The security device 302 may be in remote communication with a service provider (such as the service provider computer 200 described with respect to FIG. 2 above). The security device 302 may be configured to obtain a biometric sample from a user (e.g., a user) via the input sensors 304 and/or input sensors 306 and provide that biometric sample, or some derivation of the biometric sample, to the service provider. The security device 302 may then receive numerous types of supplemental information specific to the user from the service provider, which it may display on the display screen.

In some embodiments, the security device 302 may receive personal information 308 associated with the user. For example, the security device 302 may receive an image and/or a name stored in association with the user. In some cases, this may be used by an operator or other user of the security device 302 to visually confirm the authenticity of the user. Additionally, the security device 302 may derive a qualification status 310 based on supplemental information specific to the user. For example, when conducting a transaction that involves age-restricted material, the security device 302 may determine an age of the user based on received user's birth date information. The security device 302 may then display an indication of a qualification status 310 which indicates whether the user is old enough to conduct the transaction. In some embodiments, this determination may be made by the security device 302 automatically upon determining that a proposed transaction involves purchase conditions (e.g., age-restricted). In some embodiments, the security device 302 may be prevented from completing a transaction (e.g., providing payment credentials, as described below) if the user is determined not to meet the purchase conditions.

Additionally, the security device 302 may receive information related to an account and/or payment information for the user. For example, the security device 302 may receive an image 310 received from the service provider of a payment device associated with the user. In some embodiments, the security device 302 may receive account information, such as a payment device identifier and/or a loyalty account identifier, which may then be displayed. In some embodiments, the payment device identifier may be presented via a machine-readable code 312. In at least some of these embodiments, the machine readable code may be read by a reader (e.g., a barcode reader) of an access device.

In some embodiments, the security device 302 may be configured to complete a transaction with an access device. The security device 302 may include a contactless reader capable of interacting with an access device associated with a resource provider. During a transaction, the security device 302 may receive transaction details from an access device, which it may use to generate a cryptogram. The security device may then convey the cryptogram and a payment device identifier (e.g., a token) to the access device to complete the transaction.

In its use, the security device 302 may be configured to obtain a biometric sample from a user and transmit that biometric sample to a service provider. The service provider may then respond by providing an identity of the user and corresponding account information to the security device 302. An operator of the security device 302 may then conduct a transaction with an access device using the security device 302. For example, the operator of the security device 302 may bring the security device 302 into communicative contact with the access device. In this example, the security device 302 is then provided with transaction details. The security device 302 then generates a cryptogram and provides the generated cryptogram and account information to the access device.

Figure 4:
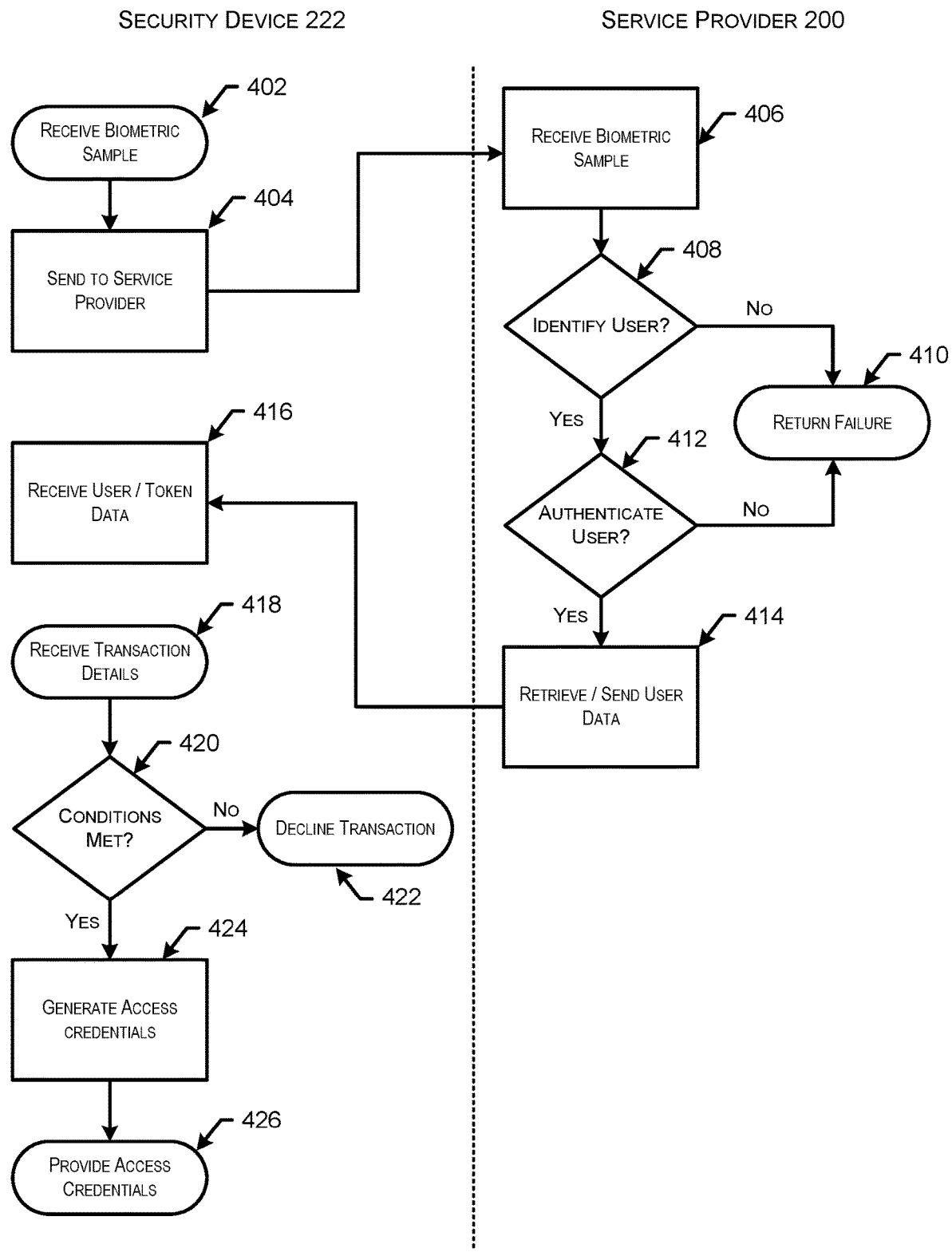
FIG. 4 depicts a flow chart illustrating an example process for providing access credentials to an access device upon receiving a biometric sample in accordance with at least some embodiments.

FIG. 4 depicts a flow chart illustrating an example process for providing access credentials to an access device upon receiving a biometric sample in accordance with at least some embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least some embodiments, the process 400 of FIG. 4 may be performed by a service provider 200 and a security device 222 as depicted in FIG. 2. The code may be stored on a computer-readable storage medium, for example, in the form of a computer program including a plurality of instructions executable by one or more processors. The computer-readable storage medium may be non-transitory.

Process 400 may begin at 402, when a biometric sample is received by the security device 222 from a user. For example, as described elsewhere, the security device 222 may obtain a biometric sample via one or more input sensors installed on the security device 222. For example, a user may scan his or her fingerprint into a fingerprint scanner installed on, or in communication with, the security device 222. In another example, the user's facial features may be captured via a camera device of the security device 222.

At 404, the security device 222 may transmit the obtained biometric sample to a service provider. In some embodiments, the security device 222 may be in communication with the service provider 200 via a wireless connection (e.g., via a cellular network). In some embodiments, the wireless connection may be a secure connection, such that information transmitted over that connection is encrypted using cryptographic keys available to the security device 222 and service provider 200 (e.g., dual private cryptographic keys or a symmetric cryptographic key).

At 406, the service provider 200 may receive the biometric sample. Upon receiving the biometric sample, at 408, the process 400 may involve the service provider 200 identifying the user from which the biometric sample was obtained. To do this, the service provider 200 may match the received biometric sample to various biometric templates stored by the service provider 200 in relation to user accounts. In some cases, this may involve deriving a set of relationships between points in the biometric sample (e.g., facial landmarks) and comparing the set of relations to those indicated within each biometric template. In some embodiments, the service provider 200 may receive a biometric template form the security device 222 which has been derived from the biometric sample. If the service provider 200 is unable to identify the user by determining a match between the biometric sample and a stored biometric template, then the service provider 200 may return a failure to the security device 222 at 410.

At 412, the process 400 may involve authenticating the user. To do this, the service provider 200 may determine a degree to which the received biometric sample is matched to the biometric template stored in association with the identified user. The service provider 200 may then determine whether the degree to which the two are matched is greater than a threshold value. For example the service provider 200 may determine whether the degree to which the two are matched is greater than some percentage (e.g., 98%). If the degree to which the two are matched is greater than the threshold value, then the user may be authenticated. If the degree to which the two are matched is not greater than the threshold value, then the service provider 200 may return a failure to the security device 222 at 410.

At 414, the process 400 may involve, upon authentication of the user, retrieving user data for that user and sending the retrieved data to the security device. In some embodiments, this may involve retrieval of a token or other payment identifier from a token service. This may further involve identifying a payment device identifier associated with the user's account and providing that payment device identifier to the token service, for the payment device identifier to be mapped to a token. In some cases, the service provider 200 may, in addition to a token, receive additional data that may be used to complete a transaction from the token service. For example, the service provider 200 may receive a key (e.g., a limited use key) which may be used in conjunction with the token to conduct a transaction.

Additionally, the service provider, at 414, may identify a number of supplemental information that may be provided to the security device. For example, the service provider 200 may retrieve demographic information for the user (e.g., age, race, income, etc.) or access level data associated with the user (membership, status, tickets, etc.). In some embodiments, the information to be provided to the security device may be determined based on one or more factors. For example, the service provider 200 may receive a location of the security device 222 and may provide data based on that location. In this example, a security device 222 determined to be at an airport may be provided with airplane ticketing information. In a second example, a security device may be provided with ticketing data for events that are to occur on the date that the biometric sample is received.

At 416, the process 400 may involve the security device 222 receiving the information from the service provider 200.

In some embodiments, the security device 222 may display at least a portion of the received information on a display screen. For example, the security device 222 may receive and present an image and/or name of the user so that an operator of the security device 222 may visually confirm the identity of the user. The security device 222 may also present an age of the user so that an operator of the security device 222 may determine whether the user qualifies to conduct age-restricted transactions. Once the user information has been received by the security device 222, that information may be used by the security device to complete a transaction.

At 418, the process 400 may involve receiving, at the security device 222, a number of transaction details. In some embodiments, the security device 222 may be placed (e.g., by an operator) within communicative distance of an access device having a contactless reader. In this example, information related to a potential transaction may be conveyed to the security device 222.

In some embodiments, a transaction to be conducted may be associated with one or more conditions to be met to complete the transaction. For example, a transaction may require that a user have a certain membership status with a particular organization or that the user be at least of a certain age. At 420, the process 400 may involve determining whether the transaction is associated with any conditions and subsequently whether those one or more conditions are met based on information received in relation to the user. As described elsewhere, this may involve matching demographic and/or access level data for the user to the one or more conditions. In some embodiments, if the one or more conditions are not met by the user, then the transaction may be declined automatically at 422.

At 424, the process 400 may involve generating access credentials to be used in completing the transaction. In some embodiments, this may involve generating a cryptogram from information received by the security device 222 from the service provider 200 as well as information received by the security device 222 from the access device.

At 426, the process 400 may involve providing the access credentials to the access device. In some embodiments, this may involve the generation of a machine-readable code which may be displayed upon a screen of the security device 222 to be scanned using a code reader (e.g., a barcode reader). In some embodiments, the security device 222 may provide the access credentials back to the access device via a contactless reader. For example, steps 418 through 426 may be performed within a short period of time in which the security device enters and exits a proximity of the contactless reader. It should further be noted that certain steps of the process described with respect to FIG. 4 may not be required in all embodiments of the disclosure. For example, some embodiments of the invention may not perform steps 418 through 422, such that, upon receiving payment information from the service provider 200, the security device 222 may be configured to generate and provide the access credentials (e.g., via the machine-readable code) to initiate the transaction.

Also, with respect to FIG. 4, the transaction cryptogram generation processes described with respect to FIG. 1 can be included in the process described with respect to FIG. 4.

Figure 5:
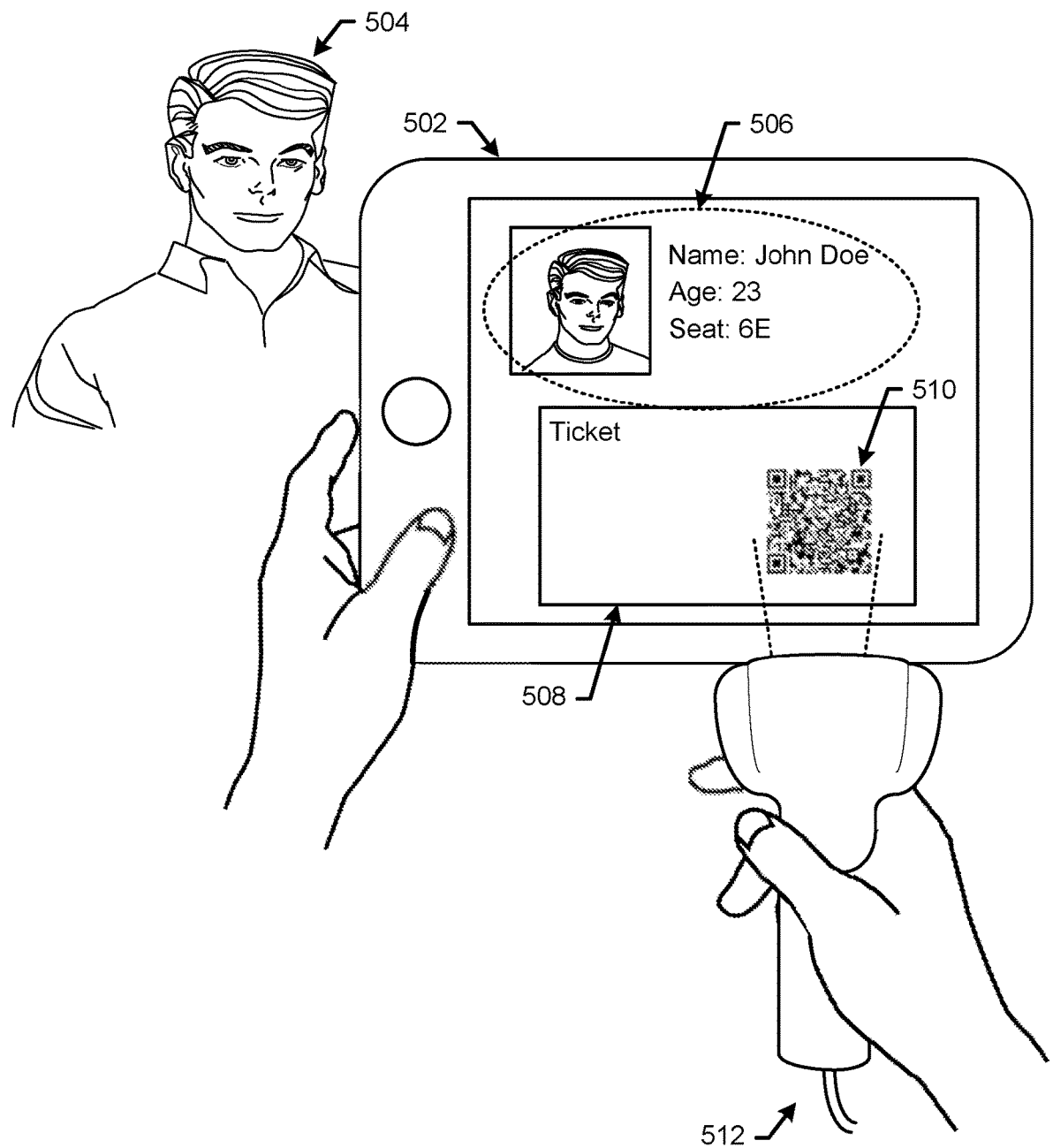
FIG. 5 depicts an illustrative example of a use case in which a security device may be implemented in accordance with at least some embodiments.

FIG. 5 depicts an illustrative example of a use case in which a security device may be implemented in accordance with at least some embodiments. More particularly, FIG. 5 illustrates a use case in which a security device 502 is operated by an operator which is different from a user 504 who wishes to conduct a transaction.

For the purposes of FIG. 5, consider a scenario in which a security device 502 obtains a biometric sample (in this case facial feature data) from a user 504. In this example, the biometric sample, or a derivation of the biometric sample, would be sent by the security device 502 to a remote service provider. In response to sending the biometric sample, the security device may receive an indication of an identity of the user 504 as well as supplemental information associated with user 504.

As depicted in FIG. 5, at least a portion of the received user information 506 may be displayed upon the security device 502. For example, the security device 502 may present an image of the user 504 so that the operator may visually confirm the identity of the user. As is also depicted, the security device 502 may present a number of user-specific details that may enable the operator to make a determination regarding a transaction to be conducted.

Additionally, the security device may receive access credential information 508 (e.g., a token, account identifier, ticket, etc.) related to the user 504 from the service provider. In some cases, the security device 502 may generate access credentials based on information provided by the service provider. At least a portion of the access credential data may be displayed.

Access credential data may be conveyed to an access device 512. In the depicted scenario, the access credential is conveyed via a machine readable code 510 to a barcode reader in communication with access device 512. As would be apparent to one skilled in the art, the described scenario enables the user 504 to complete a transaction without having a physical version of his or her access credentials with him or her. Additionally, since the security device 502 is able to generate/obtain the appropriate access credentials and convey them to an access device, the system is compatible with any conventional terminal. In other words, incorporation of embodiments of the system described herein would not require a reconfiguration of an existing point-of-sale system.

Figure 6:
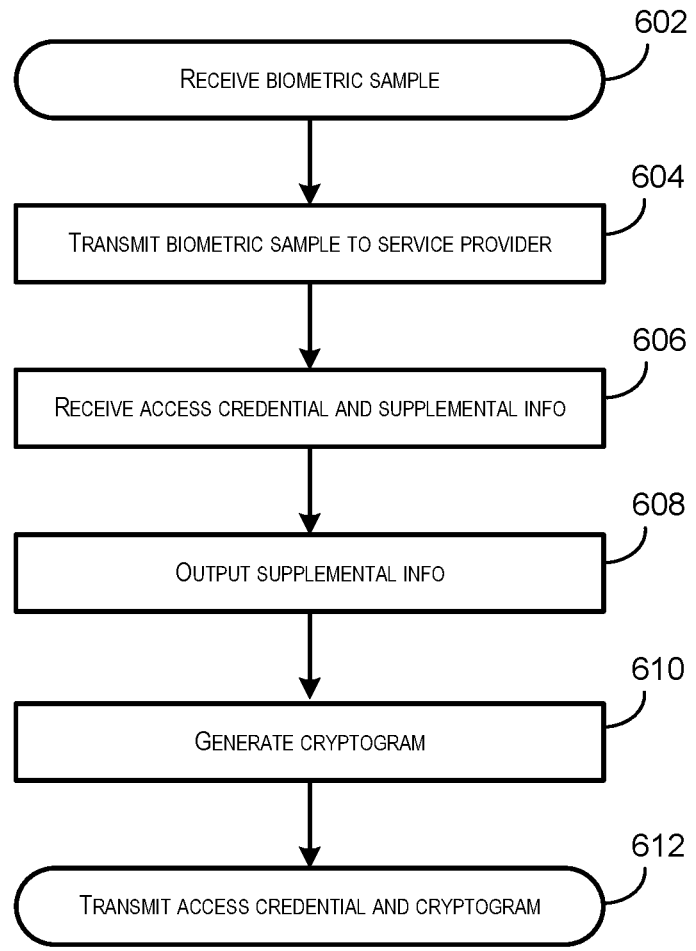
FIG. 6 depicts a flow diagram illustrating an example process for receiving a biometric sample and providing access credential data in accordance with at least some embodiments.

FIG. 6 depicts a flow diagram illustrating an example process for receiving a biometric sample and providing access credential data in accordance with at least some embodiments. The process 600 may be performed by the security device 222 as described with respect to FIG. 2 above.

Process 600 may begin at 602, when a biometric sample is received in relation to a user. In some embodiments, the biometric sample received from the user comprises facial data, fingerprint data, or voice data. In some embodiments, a biometric template may be derived from the biometric sample at the security device. For example, the security device may determine a set of relationships between various features in the biometric sample and may derive a biometric template having that set of relationships.

At 604, the process 600 may involve transmitting the biometric sample (or a derivation thereof) to a service provider computer. In some cases, the security device sends the biometric sample itself. In some cases, the security device sends a biometric template derived from the biometric sample.

At 606, the process 600 may involve receiving access credential data and/or supplemental information associated with the user. In some embodiments, the access credential data comprises at least an access token and a cryptographic key.

At 608, the process 600 may involve outputting at least a portion of the supplemental information. In some embodiments, the process may also involve outputting an indication that the match is present. In some embodiments, the supplemental information relates to an age of the user. In some embodiments, the supplemental information relates to a level of access for the user. For example, the cryptographic key may be a limited use key.

At 610, the process 600 may involve generating an interaction cryptogram. The process 600 may further involve receiving transaction data from the access device, wherein the interaction cryptogram is generated in response to receiving the transaction data. the transaction data received from the access device may include one or more conditions of completing a transaction. The process 600 may further involve determining, based on the supplemental information associated with the user account, whether the one or more conditions of completing the transaction are met. Upon determining the one or more conditions of completing the transaction are not met declining the transaction. The interaction cryptogram may be formed by encrypting a portion of the transaction data received from the access device and the access token using a cryptographic key. For example, the interaction cryptogram may be formed by encrypting at least one of a transaction amount, terminal identifier, or unpredictable number.

At 612, the process 600 may involve transmitting the access credential data and the cryptogram to an access device to be used to complete a transaction. The security device may be in wireless communication with the access device. In some embodiments, at least a portion of the supplemental information associated with the user account may be used to determine whether the transaction is to be authorized. In some embodiments, the access device, upon receiving authorization, may be caused to provide instructions to an access gate, the instructions causing the access gate to grant the user access to a secure area. In some embodiments, the process 600 may further involve deleting, from the security device, the access credential data within a predetermined period of time after transmitting the access credential data to the access device.

Embodiments of the invention provide several technical advantages over conventional systems. For example, using embodiments of the system described herein, a resource provider can incorporate the security of biometric authentication without making substantial changes to existing equipment (e.g., without add a new, separate biometric POS device). The resource provider also doesn't need a new payment acquiring process as the transaction follows existing an EMV card present transaction flow. Further, as noted above, in embodiments of the invention, supplemental information can be obtained along with an access token to conduct a transaction using existing access device hardware. Supplemental information and payment information needed by a resource provider to conduct a transaction can be received in a single data transaction, in response to biometric verification of a user. This requires fewer steps than conventional methods, and is also more convenient for the user and is more secure.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a security device in an interaction, a biometric sample from a user;
transmitting, by the security device, the biometric sample of the user or a biometric template thereof to a service provider computer, wherein the service provider computer matches the biometric sample or the biometric template to a user account, thereby authenticating the user;
upon matching the biometric sample or the biometric template to the user account, receiving, by the security device, access credential data and supplemental information associated with the user account in a single data transmission, and outputting the supplemental information on a display of the security device, wherein the access credential data comprises an access token, wherein the access token is a substitute for a credential, the credential being a primary account number;
generating, by the security device, an interaction cryptogram by encrypting a transaction amount and an unpredictable number from an access device, and the access token using a cryptographic key, the interaction cryptogram serving as proof that the security device and the access device interacted during the interaction, wherein the security device and the access device communicate with each other using short-range communication; and
after a resource provider reviews and verifies the displayed supplemental information, transmitting, by the security device, the access token and the interaction cryptogram to the access device in communication with the security device, wherein the access device generates a first authorization request message comprising the access token, the interaction cryptogram, and the transaction amount, and transmits the first authorization request message to a processing network, which verifies the interaction cryptogram (i) by encrypting the transaction amount and the unpredictable number using another cryptographic key corresponding to the cryptographic key to produce an encrypted value and comparing the encrypted value with the interaction cryptogram and determining that the interaction cryptogram and the encrypted value match, or (ii) by decrypting the interaction cryptogram using the another cryptographic key to obtain the transaction amount, the unpredictable number, and the access token, and determining that the obtained transaction amount, the unpredictable number, and the access token matches the transaction amount, the unpredictable number, and the access token in the first authorization request message, generates a second authorization request message comprising the credential and the transaction amount, and transmits the second authorization request message to an authorization provider for authorization.

2. The method of claim 1, further comprising outputting, by the security device, an indication that the biometric sample and the biometric template match.

3. The method of claim 2, wherein the supplemental information relates to an age of the user.

4. The method of claim 1, wherein the supplemental information relates to a level of access for the user.

5. The method of claim 1, wherein the access token has a same format as the credential.

6. The method of claim 1, wherein the cryptographic key is a limited use key.

7. The method of claim 1, wherein the access device, upon receiving authorization, is caused to provide instructions to an access gate, the instructions causing the access gate to grant the user access to a secure area.

8. The method of claim 1, wherein at least a portion of the supplemental information associated with the user account is used to determine whether a transaction associated with the first authorization request message is to be authorized.

9. The method of claim 1, further comprising deleting, from the security device, the access credential data within a predetermined period of time after transmitting the access token to the access device.

10. The method of claim 1, wherein the access device is a POS terminal.

11. A security device comprising:
a processor; and
a memory including instructions that, when executed with the processor, cause the security device to, at least:
receive in an interaction a biometric sample from a user;
transmit the biometric sample of the user or a biometric template thereof to a service provider computer, wherein the service provider computer matches the biometric sample to a user account, thereby authenticating the user;
upon matching the biometric sample or the biometric template to the user account, receive access credential data and supplemental information associated with the user account in a single data transmission, and output the supplemental information on a display of the security device, wherein the access credential data comprises an access token, wherein the access token is a substitute for a credential, the credential being a primary account number;
generate an interaction cryptogram by encrypting a transaction amount, an unpredictable number from an access device and the access token using a cryptographic key, the interaction cryptogram serving as proof that the security device and the access device interacted during the interaction, wherein the security device and the access device communicate with each other using short-range communication; and
after a resource provider reviews and verifies the displayed supplemental information, transmit the access token and the interaction cryptogram to the access device in communication with the security device, wherein the access device generates a first authorization request message comprising the access token, the interaction cryptogram, and the transaction amount, and transmits the first authorization request message to a processing network, which verifies the interaction cryptogram (i) by encrypting the access token, the transaction amount and the unpredictable number using another cryptographic key corresponding to the cryptographic key to produce an encrypted value and comparing the encrypted value with the interaction cryptogram and determining that the interaction cryptogram and the encrypted value match, or (ii) by decrypting the interaction cryptogram using the another cryptographic key to obtain the transaction amount, the unpredictable number, and the access token, and determining that the obtained transaction amount, the unpredictable number, and the access token matches the transaction amount, the unpredictable number, and the access token in the first authorization request message, generates a second authorization request message comprising the credential and the transaction amount, and transmits the second authorization request message to an authorization provider for authorization.

12. The security device of claim 11, wherein the instructions when executed by the processor further causes the security device to receive transaction data from the access device, and wherein the interaction cryptogram is generated in response to receiving the transaction data.

13. The security device of claim 12, wherein the access device is a POS terminal.

14. The security device of claim 13, wherein the transaction data received from the access device comprises the transaction amount, a terminal identifier for the access device, and the unpredictable number.

15. The security device of claim 12, wherein the transaction data received from the access device comprises one or more conditions of completing a transaction.

16. The security device of claim 15, wherein the instructions, when executed by the processor, further cause the security device to determine, based on the supplemental information associated with the user account, whether the one or more conditions of completing the transaction are met.

17. The security device of claim 16, wherein upon determining the one or more conditions of completing the transaction are not met, the transaction is declined.

18. The security device of claim 11, wherein the biometric sample received from the user comprises facial data, fingerprint data, or voice data.

19. A system comprising:
a security device comprising,
a processor, and
a memory including instructions that, when executed with the processor, cause the security device to, at least:
receive in an interaction a biometric sample from a user,
transmit the biometric sample of the user or a biometric template thereof to a service provider computer, wherein the service provider computer matches the biometric sample to a user account, thereby authenticating the user,
upon matching the biometric sample or the biometric template to the user account, receive access credential data and supplemental information associated with the user account in a single data transmission, and output the supplemental information on a display of the security device, wherein the access credential data comprises an access token, wherein the access token is a substitute for a credential, the credential being a primary account number,
generate an interaction cryptogram by encrypting a transaction amount and an unpredictable number from an access device, and the access token using a cryptographic key, and
after a resource provider reviews and verifies the displayed supplemental information, transmit the access token and the interaction cryptogram to the access device in communication with the security device, such that the access device is caused to generate a first authorization request message comprising the access token, the interaction cryptogram, and the transaction amount, and transmit the first authorization request message to a processing network, which verifies the interaction cryptogram (i) by encrypting the access token, transaction amount and the unpredictable number using another cryptographic key corresponding to the cryptographic key to produce an encrypted value and comparing the encrypted value with the interaction cryptogram and determining that the interaction cryptogram and the encrypted value match, or (ii) by decrypting the interaction cryptogram using the another cryptographic key to obtain the transaction amount, the unpredictable number, and the access token, and determining that the obtained transaction amount, the unpredictable number, and the access token matches the transaction amount, the unpredictable number, and the access token in the first authorization request message, generates a second authorization request message comprising the credential and the transaction amount, and transmits the second authorization request message to an authorization provider for authorization; and
the access device, wherein the security device and the access device communicate with each other using short-range communication.

20. The system of claim 19, further comprising:
the service provider computer, the service provider computer being in remote communication with the security device.

* * * * *